Sept. 21, 1937.   E. C. STEINER   2,093,743
BORING HEAD
Filed Aug. 26, 1936    2 Sheets-Sheet 1
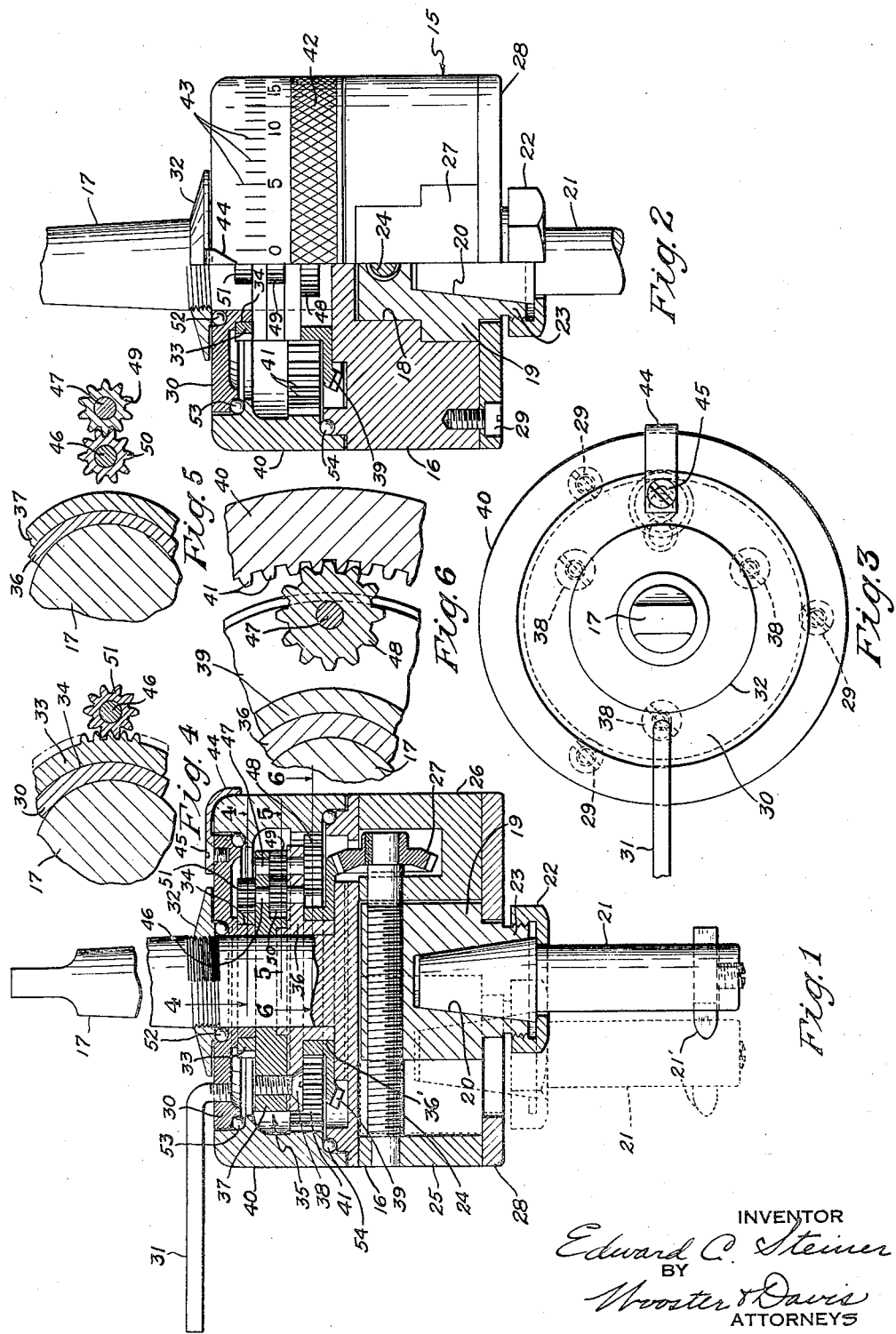
INVENTOR
Edward C. Steiner
BY
Wooster & Davis
ATTORNEYS Sept. 21, 1937.  E. C. STEINER  2,093,743
BORING HEAD
Filed Aug. 26, 1936  2 Sheets-Sheet 2
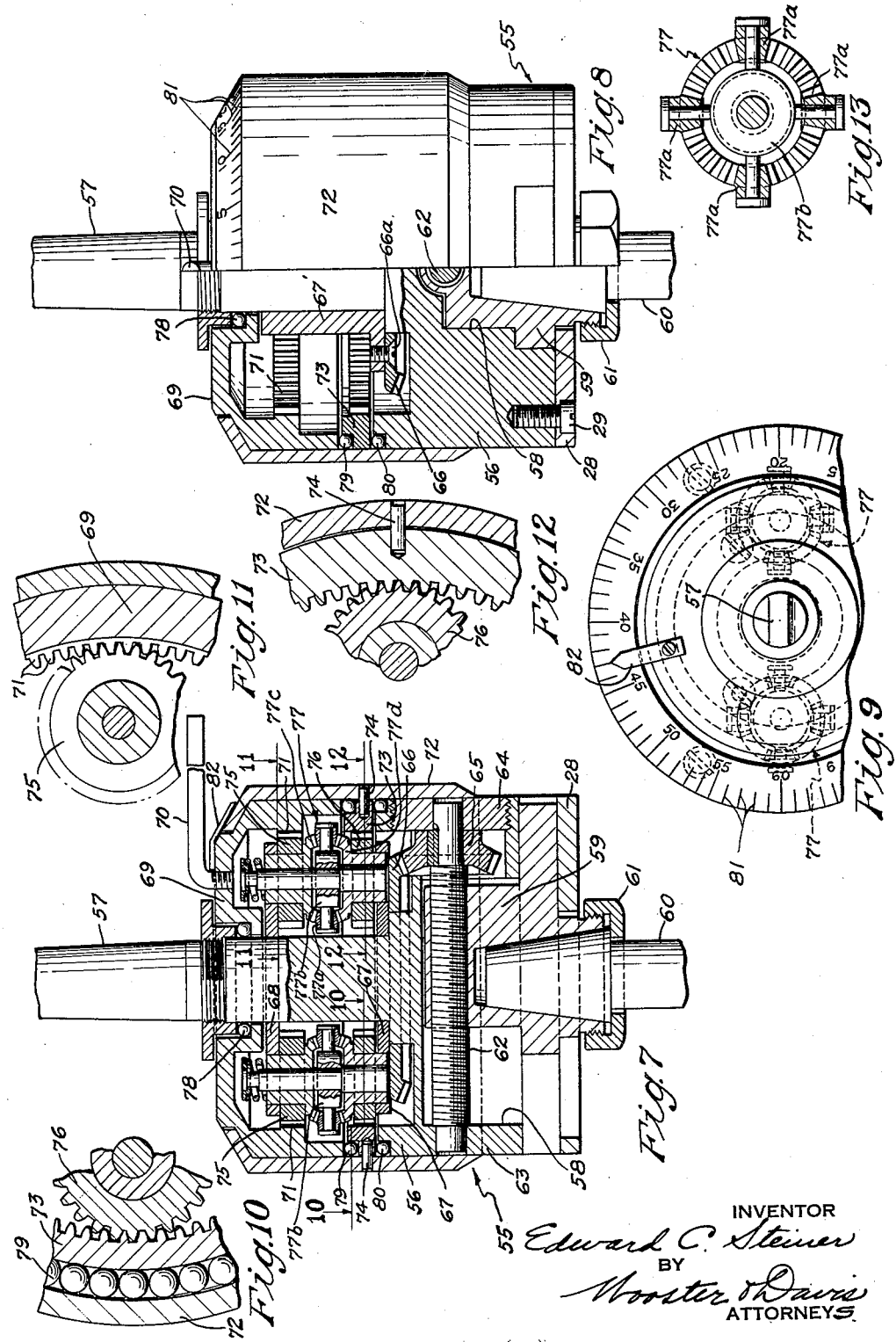
INVENTOR
Edward C. Steiner
BY
Wooster & Davis
ATTORNEYS Patented Sept. 21, 1937

2,093,743

UNITED STATES PATENT OFFICE 2,093,743

BORING HEAD

Edward C. Steiner, Bridgeport, Conn.

Application August 26, 1936, Serial No. 98,078

6 Claims. (Cl. 77—1)

This invention relates to new and useful improvements in tool holders and has particular relation to boring heads.

An object of the invention is to provide a boring head including means whereby a boring tool may be adjusted while the head is running or in operation.

Another object is to provide a boring head of the type indicated and including an improved construction requiring but small space whereby the improved heads may be made in the smaller sizes.

Other objects and advantages will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 1 is a vertical sectional view through a boring head constructed according to the present invention;

Fig. 2 is a view thereof partly in section and partly in side elevation and taken at right angles to Fig. 1;

Fig. 3 is a top plan view of the improved boring head;

Fig. 4 is a detailed sectional view taken substantially along the plane of the line 4—4 in Fig. 1;

Fig. 5 is a detail sectional view taken substantially along the plane of the line 5—5 in Fig. 1;

Fig. 6 is a detail sectional view taken substantially along the plane of the line 6—6 in Fig. 1;

Fig. 7 is a view similar to Fig. 1 but showing a modified construction;

Fig. 8 is a view at right angles to Fig. 7 and showing the modified construction partly in section and partly in elevation;

Fig. 9 is a plan view of the head of Figs. 7 and 8;

Fig. 10 is a detail sectional view taken substantially along the plane of the line 10—10 in Fig. 7;

Fig. 11 is a detail sectional view taken substantially along the plane of the line 11—11 in Fig. 7;

Fig. 12 is a detail sectional view taken substantially along the plane of the line 12—12 in Fig. 7; and Fig. 13 is a detail sectional view showing a differential gearing employed.

Referring in detail to the drawings and at first particularly to Figs. 1 through 6 the improved boring head is shown as including a body generally designated 15 comprising a head 16 and a stem 17 the upper or outer end of which is adapted to be inserted into any suitable tool holder or chuck whereby the boring head will be driven. In the body 16 is a transverse slot or guideway 18 in which is slidably mounted a tool carrying block 19 adapted to be adjusted radially in said slot as will later appear. Block 19 has an opening 20 to receive the upper end of a boring tool including a shank 21 and a cutter 21', the shank being secured in place by means of a clamping nut 22 threaded to an extension 23 of the block.

A screw 24 is threaded through the block 19 and has bearing in the blocks 25 and 26 closing the respective ends of the guideway 18, and obviously on said screw being turned about its longitudinal axis the tool carrying block will be fed or adjusted in one direction or the other along said guideway so as to vary the eccentricity of the tool 21 relative to the axis of the boring head, and thus vary the diameter of the hole that is bored. Secured to the screw 24 is a gear 27 adapted to be turned or rotated as will later appear so as to operate the screw and thereby adjust the block 19 to have the tool 21 bore a larger or smaller hole. A plate 28 is secured to the inner side of the head 16 as by screws 29 and serves to partly close the lower side of the guideway 18.

Located on the stem 17 in spaced relation to the head 16 is a plate 30 with respect to which the stem may rotate and which is held stationary by an arm or the like 31 extending into engagement with an adjacent stationary portion of the machine such for example as the frame (not shown). The plate is held against upward movement on the stem by means of a nut 32, and at its underside the plate carries a gear 33 secured to it by any suitable means such for example as a shrunk or forced fit on the turned portion 34, and the purpose of which will later appear.

Disposed on the stem 17 between the head 16 and the plate 30 is a carrier means 35 comprising members 36 and 37 secured together as by screws 38. This means 35 turns, normally, with the stem 17 but may be turned relative thereto, and such means carries a gear 39 meshing with the gear 27 on the screw 24. The gear 39 is secured to member 36 by any suitable means such for example as a forced fit on the turned portion 36'. Also on the body 15 is an internal gear member 40 having the gear teeth 41 on its inner side, and exteriorly this member is knurled at 42 and is provided with graduations 43 adapted to be read in connection with a pointer 44 secured to the stationary plate 30 as by a screw 45.

The members 36 and 37, comprising the means 35, carry a pair of short parallel shafts 46 and 47 which have bearings in these members. Secured on the lower end of shaft 47 is a pinion 48 meshing with the internal gear 40 and also on such shaft between the members 36 and 37 is a pinion 49 meshing with a pinion 50 on the shaft 46, and at its upper end such shaft 46 carries a pinion 51 meshing with the stationary external gear 33. During a boring operation the means 35 and the parts carried thereby rotate with the head and stem of the body 15 as do the tool carrying block 19, screw 24 and gear 27. The gears 33, 40, 48, 49, 50 and 51 are so proportioned that gears 48 and 51 simply roll around on the normally stationary internal gear 40 and the stationary external gear 33 respectively.

Therefore no turning movement of the carrier means 35 relative to the body 15 takes place during normal operation of the boring head and the gears 27 and 39 move together as a unit with the body 15 so that there is no relative movement of such gears and consequently there is no adjustment of the screw 24. When the tool is to be adjusted either for a larger or smaller hole, as for example for a larger hole as suggested by the dotted line position in Fig. 1, the normally stationary internal gear 40 is manually turned. This may be accomplished while the boring head is running or in operation and the manual adjustment or turning of the normally stationary internal gear imparts extra movement to gear 48 and through it to gear 49, gear 50 and gear 51. The latter acting against the stationary gear 33, the means 35 is caused to move relative to the stem 17 of the body 15 and carries the gear 39 with it.

Such movement of gear 39 is relative to the gear 27 with which it meshes and accordingly movement is imparted to such gear 27 with the result that the screw 24 is rotated and feeds the tool carrying block 19 along the guideway 18 thus adjusting the radial position of the tool 21—21'. Between the plate 30 and the stem 17 are ball bearings 52, and ball bearings 53 are between such plate and the normally stationary internal gear 40, while other ball bearings 54 are between such gear and the head 16.

Referring now to Figs. 7 through 12 the boring head is shown as including a body 55 comprising an integral construction of head 56 and stem or shank 57. In the inner end of the head 56 is a transverse slot or guideway 58 in which is slidably mounted a tool carrying block 59 supporting a tool 60 detachably secured to the block as by a clamping nut 61. A screw 62 is threaded through the block 59 and at one end has bearing in a wall at 63 and at its other end has bearing in a plug 64 shown as threaded into the body 55.

Fixed to the screw 62 is a gear 65 meshing with a gear 66 fixed as by screws 66a to a plate-like member 67 on a sleeve 67' which is mounted on the stem 57 and may turn thereon. Above member 67 and also on the sleeve 67' is a second plate-like member 68, and said plate-like members are connected to move together as will later be explained and while they normally move with the stem 57 they may be moved relative to it for the purpose of turning the screw and thus making an adjustment of the tool carrying block 59 and the tool 60.

A member 69 about the stem 57 is held stationary as for example by an arm 70 made to engage any convenient stationary part of a machine such for example as the frame (not shown). Such member comprises a stationary internal gear being provided with teeth 71. An outer normally stationary shell 72 carries an internal gear 73 secured thereto by any suitable means, as by pins 74. Plate-like members 67 and 68 support spur gears 75 and 76 meshing respectively with the internal gears 71 and 73. Small differential gear means 77 connect the upper and lower spur gears 75 and 76. The gearing arrangement just described is shown as repeated at two diametrically opposite points although it is to be understood that but one such arrangement may be used or if desired the arrangement may be repeated at more than two points, it being desirable however that the units be symmetrically disposed to keep balance. This differential gear comprises small bevel gears 77a carried on a spider 77b and each mesh with the bevel gears 77c and 77d connected to the spur gears 75 and 76 respectively, which gears 75 and 76 may rotate relatively to each other.

In the gearing arrangement just described the various gears are so proportioned that during normal operation the spur gears run around on the internal gears as the boring head is used. Thus the outer shell 72 and the internal gear 73 carried thereby normally remain stationary while the head is in use. However, when an adjustment is to be made the outer shell 72 is manually turned or shifted to impart extra movement to the spur gear 76 and such movement is, through the differential gearing 77, imparted to the spur gear 75 and the latter reacting against the stationary gear 71 causes movement of the carrier comprising the plate-like members 67 and 68 relative to the body 55.

Since gear 66 is carried by plate-like member 67 such gear is shifted as the outer shell 72 is manually adjusted and imparts turning movement to the gear 65 and thus the screw 62, resulting in adjustment of the tool carrying block along the guideway 58. Ball bearings 78, 79 and 80 provide for ease of relative movement between the various parts. Also shell 72 carries graduations 81 to be read in conjunction with a pointer 82 secured to the stationary internal gear member 69.

From the foregoing description it will be understood that with either form of the invention the desired adjustments may be made while the boring head is running. Depending upon the direction in which the normally stationary gear is shifted the tool carrying block and thus the tool will be adjusted to have the tool more or less eccentric with respect to the mounting stem 17 or 57 so as to cut a larger or smaller opening as required. The graduations 43 and 81 may be conveniently read in conjunction with the respective pointers 44 and 82. Owing to the gearing and the use of the adjustment screws 24 and 62 very fine adjustments of the tool may be made. Furthermore this construction is compact and does not require a great deal of space so that the head may be made in small sizes. Owing to the difference in the gearing employed in the respective forms disclosed screw 24 has a right hand thread while screw 62 has a left hand thread.

This principle for an adjusting mechanism is not confined to use in a boring head for a boring tool but may be used for adjustably mounting any other tool where it is desirable to effect a radial adjustment of the tool, or to displace one member relative to another while the device is rotating, the boring head being used merely for illustration. Examples of such uses are for small grinders, facing heads, etc.

Having thus set forth the nature of my invention, what I claim is:

1. In a rotatable boring head, a body, a tool carrying block shiftable on the body, a screw having threaded connection with the block and adapted to be rotated to shift the block relative to the body, a gear member normally stationary on the body so as to rotate therewith and movable relatively to the body, a second gear member, means holding said latter member against rotation, gearing connecting the two members proportioned to run idly between them during normal rotation of the head and to be shifted relatively to the body on relative movement of the first member, and means connecting said gearing to the screw for operating it on shifting movement of the gearing.

2. A rotatable boring head including a body and a tool carrying block shiftable transversely of the body, a screw having threaded connection with the block and adapted to be rotated to shift the block, gearing for rotating the screw, a gear member concentric with the axis of rotation of the body, means holding said member against rotation, a second gear member concentric to the axis of the body, said second member being normally stationary on the body so as to rotate therewith and mounted to be shifted relative to the body, gearing connecting the two gear members, said latter gearing being proportioned to run idly between the members during normal operation of the head and to be shifted upon relative movement of the second gear member on the body, and means to connect the second gearing to the first gearing to operate the latter to shift the block on said relative movement.

3. A rotatable boring head including a body and a tool carrying block shiftable transversely of the body, a screw having threaded connection with the block and adapted to be rotated to shift the block, a stem projecting axially from the body for mounting the head, a gear member concentric with the stem, means for holding said member against rotation, a second gear member normally stationary on the body to rotate therewith and turnable relatively to the body, a planetary gear means meshing with and connecting the two gear members, said planetary gear means being so proportioned as to run idly between the members during normal rotation of the head and shiftable relatively to the body by relative turning of the second gear member, and means connecting said planetary gear means with the screw to operate the screw on turning of said second member.

4. A rotatable tool holding head including a rotatable body member, a tool carrying member adjustable radially relative to the body member, a pair of members each carrying a gear, means preventing rotation of one of said members, said other member being mounted to normally rotate with the body and capable of being shifted relatively thereto, a planetary gear train including connected gears meshing respectively with the said first gears and movable relative to the body by adjustment of the second member on the body, and means movable with the gear train to adjust the tool carrying member relative to the body.

5. In a boring head, a body, a tool carrying block on the body, a screw having threaded connection with the block and adapted to be rotated to adjust the block relative to the body, a gear on said screw, means carried by and turnable on the body, a gear on said means and meshing with the gear on the screw, a stationary external gear on the body, a normally stationary internal gear on the body, a gear train carried by said means and including gears meshing respectively with said external and internal gears, said external and internal gears and the gears of said train being so proportioned that the gears of the train which mesh respectively with the internal and external gears normally simply run around on them as said means rotates with the body whereby the internal gear remains stationary as the body is rotated and the screw is not adjusted, and said internal gear adapted to be manually rotated to act through said gearing and shift said means and the gear meshing with the gear on the screw whereby to turn the latter and adjust the tool carrying block on the body.

6. In a boring head, a body, a tool carrying block on the body, a screw having threaded connection with the block and adapted to be rotated to adjust the block relative to the body, a gear on said screw, means carried by and turnable on the body, a gear on said means and meshing with the gear on the screw, a stationary internal gear on the body, a normally stationary internal gear on the body, spur gears meshing respectively with said internal gears, differential gears between and connecting said spur gears, said spur and differential gears carried by said means and so proportioned relative to one another and the internal gears that the spur gears normally simply run around on the latter gears whereby both internal gears remain stationary as the body is rotated and the screw is therefore not adjusted, and said normally stationary internal gear adapted to be manually adjusted to thereby act through the spur and differential gears and cause a reaction against the stationary internal gear and shift said means and thereby the gear meshing with the gear on the screw whereby to turn the latter and adjust the tool carrying block on the body.

EDWARD C. STEINER.